Patented Feb. 24, 1953

2,629,718

UNITED STATES PATENT OFFICE 2,629,718

2,5-DI-(1-AMINO-4-AROYLAMINO-2-ANTHRAQUINONYL)-1:3:4-OXDIAZOLES AND METHOD FOR THEIR PREPARATION

Philip Leigh Belshaw and Francis Irving, Blackley, Manchester, England, assignors to Imperial Chemical Industries Limited, a corporation of Great Britain No Drawing. Application May 25, 1950, Serial No. 164,294. In Great Britain June 7, 1949

8 Claims. (Cl. 260—307.5)

1

This invention relates to new vat dyestuffs and more particularly to new blue vat dyestuffs of the anthraquinone series.

Many blue vat dyestuffs of the anthraquinone series are already known and used in commerce.

However, those vat dyestuffs which give bright blue shades are invariably unsatisfactory in fastness and/or dyeing properties. The majority belonging to the indanthrone series are insufficiently fast to bleaching treatments, cannot be applied satisfactorily in the presence of hard water or by all the standard dyeing methods for vat dyestuffs, and they decompose rapidly when vatted at high temperatures. Other blue vat dyestuffs are either very dull in shade, insufficiently fast to light or insufficiently fast to water-spotting (that is to say there is a marked change in shade when the dyed cotton is spotted with water).

It is an object of the present invention to provide bright blue vat dyestuffs of the anthraquinone series which have good dyeing properties and have superior fastness properties to the known bright blue vat dyestuffs.

According to our invention we provide as new vat dyestuffs the 2:5-di-(1-amino-4-aroylamino-2-anthraquinonyl)-1:3:4-oxdiazoles of the general formula

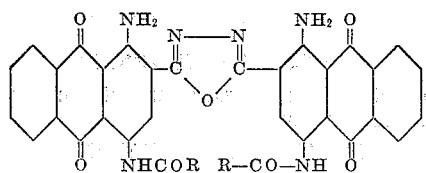

wherein R is an aryl radical of the benzene series.

The aryl radical R may carry substituents such as for example halogen atoms, alkyl-, alkyloxy-, alkanesulphonyl- and trifluoromethyl-groups.

According to a further feature of our invention we provide a process for the manufacture of new dyestuffs of the above formula which comprises treating 2:5-di-(1:4-diamino-2-anthraquinonyl)-1:3:4-oxdiazole with benzoyl chloride or anhydride or a substituted benzoyl chloride or anhydride.

The reaction may be carried out conveniently by heating the reagents together in an organic solvent, for example nitrobenzene, if desired, in the presence of pyridine, and the product may be isolated by cooling the reaction mixture, filtering off, washing with a solvent and drying.

The new dyestuffs of our invention have excellent dyeing properties. They are superior to dyestuffs of the indanthrone series in their superior fastness to bleaching and in their ability to dye well in the presence of hard water and their ability to dye by all the standard dyeing procedures employed for vat dyestuffs, so that they are more suitable for use in mixtures with other dyestuffs than the dyestuffs of the indanthrone series. They are stable to vatting and dyeing at high temperatures, such as for example at about 95° C., so that they are suitable for use in the modern dyeing processes which involve the use of high temperature vatting, such as continuous dyeing processes, and they are also suitable for use in those cases where it is necessary to take advantage of the greater power of re-distribution of the dyestuff at elevated temperatures. The new dyestuffs dye cellulosic textile materials in blue shades which are fast to water-spotting and bleaching, and the shades obtained are brighter and faster than those obtained from previously known dyestuffs of good dyeing properties which give blue shades fast to bleaching and water spotting.

The invention is illustrated but not limited by the following examples in which the parts are by weight.

Example 1

A mixture of 9 parts of 2:5-di-(1:4-diamino-2-anthraquinonyl)-1:3:4-oxdiazole and 60 parts of nitrobenzene is stirred at 130° C. and a mixture of 10 parts of benzoyl chloride, 20 parts of nitrobenzene and 1 part of pyridine is added slowly. The reaction is completed by stirring the mixture for about 6 hours at 130° C. The mixture is cooled and the product is filtered off, washed with nitrobenzene and benzene and dried. The product 2:5-di-(1-amino-4-benzoylamino-2-anthraquinonyl)-1:3:4-oxdiazole, is a blue powder which dissolves in concentrated sulphuric acid to give an olive-green solution. It gives a violet sodium hydrosulphite vat from which cotton is dyed in powerful bright blue shades. The dyeings so obtained are exceptionally fast to washing, bleaching and soda boiling treatment and to light. The new vat dyestuff is furthermore characterised by excellent dyeing properties. It is not susceptible to hard water in the dyebath and it can be dyed by all the normal methods used for vat dyeing with anthraquinone vat dyestuffs. In particular, it can be vatted and dyed at 95° C. without any marked change of shade or loss of colour strength.

The 2:5-di-(1:4-diamino-2-anthraquinonyl)-1:3:4-oxidiazole used in the above example may be prepared by reacting 4-nitro-1-aminoanthraquinone-2-carboxylic acid chloride with hydrazine to obtain the monohydrazide, condensing this with a further molecular proportion of the acid chloride to form N:N'-di-(4-nitro-2-amino-2-anthraquinone-2-carbonyl)-hydrazine, ring closing with thionyl chloride in nitrobenzene and finally reducing the nitro groups with sodium sulphide.

If in place of the benzoyl chloride used in the above example an equivalent amount of p-methyl benzoyl chloride is employed, the product is a similar fast blue vat dyestuff a little greener in shade than the benzoyl derivative.

*Example 2*

A mixture of 10 parts of 2:5-di-(1:4-diamino-2-anthraquinonyl)-1:3:4-oxdiazole and 70 parts of nitrobenzene is stirred at 130° C. and a mixture of 14 parts of p-chlorobenzoyl chloride, 20 parts of nitrobenzene and 1 part of pyridine is added slowly. The reaction mixture is stirred for 8 hours at 130° C. The mixture is cooled and the product is filtered off, washed with nitrobenzene and then with benzene and dried. The product, which is 2:5-di-(1-amino-4-p-chlorobenzoylamino-2-anthraquinonyl-1:3:4-oxdiazole, is a blue powder which dissolves in concentrated sulphuric acid to give a green solution. The product gives a red-violet vat in alkaline hydrosulphite solution from which cotton is dyed in powerful bright blue shades, somewhat redder and brighter than those given by the corresponding benzoyl derivative. It possesses the same high fastness properties as the latter, and has also the same excellent dyeing properties.

If instead of the p-chlorobenzoyl chloride, equivalent amounts of o- or m-chloro- or p-bromo-benzoyl chlorides are used, similar fast blue vat dyestuffs are obtained.

*Example 3*

A mixture of 10 parts of 2:5-di-(1:4-diamino-2-anthraquinonyl)-1:3:4-oxdiazole and 65 parts of nitrobenzene is stirred at 130° C. and a mixture of 14 parts of m-methoxy-benzoyl chloride, 15 parts of nitrobenzene and 1 part of pyridine is added slowly. The reaction mixture is stirred for 8 hours at 130° C. The mixture is cooled and the product is filtered off, washed with nitrobenzene and then with benzene and dried. The product, 2:5-di-(1-amino-4-m-methoxybenzoylaminoanthraquinonyl)-1:3:4-oxdiazole is a blue powder which dissolves in concentrated sulphuric acid to give a green solution. The product gives a red-violet vat in alkaline hydrosulphite solution, from which cotton is dyed in powerful bright blue shades, somewhat greener than those given by the benzoyl derivative. It possesses all the advantageous fastness and dyeing properties of the latter.

If in place of the m-methoxy-benzoyl chloride an equivalent amount of p-methoxy-benzoyl chloride is used, a dyestuff closely similar to that described above is obtained.

In a similar manner, 2:5-di-(1:4-diamino-2-anthraquinonyl)-1:3:4-oxdiazole may be acylated with β-naphthoyl chloride, p-methylsulphonylbenzoyl chloride or m-trifluoro methylbenzoyl fluoride to obtain in all cases similar blue vat dyestuffs in which two of the amino groups are acylated. These dyestuffs all possess excellent fastness and dyeing properties.

What we claim is:
1. New vat dyestuffs of the formula

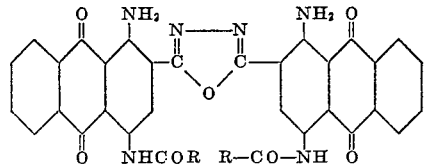

wherein R is selected from the group consisting of mono- and dicyclic carbocylic aryl radicals.

2. A new vat dyestuff according to claim 1 wherein R is a monocyclic carbocyclic aryl radical.

3. A new vat dyestuff according to claim 1 wherein R is the phenyl radical.

4. A new vat dyestuff according to claim 1 wherein R is a halogen substituted phenyl radical.

5. A new vat dyestuff according to claim 1 wherein R is a lower alkyl substituted phenyl radical.

6. A new vat dyestuff according to claim 1 wherein R is a lower alkoxy substituted phenyl radical.

7. A new vat dyestuff according to claim 1 wherein R is the naphthyl radical.

8. Process for the manufacture of 2:5-di-(1-amino-4-aroylamino-2-anthraquinonyl)-1:3:4-oxdiazoles which comprises treating 2:5-di-(1:4-diamino-2-anthraquinonyl)-1:3:4-oxdiazole with a compound selected from the group consisting of the anhydrides and chlorides of monocyclic and dicyclic carbocyclic monocarboxylic acids.

PHILIP LEIGH BELSHAW.
FRANCIS IRVING.

REFERENCES CITED

The following references are of record in the file of this patent:

UNITED STATES PATENTS

| Number | Name | Date |
|---|---|---|
| 2,464,831 | Stillmar | Mar. 22, 1949 |